(12) United States Patent
Chang

(10) Patent No.: US 8,096,773 B2
(45) Date of Patent: Jan. 17, 2012

(54) VERTICAL AXIS WIND TURBINE

(76) Inventor: Chin-Feng Chang, Taichung Hsien (TW)

( * ) Notice: Subject to any disclaimer, the term of this patent is extended or adjusted under 35 U.S.C. 154(b) by 518 days.

(21) Appl. No.: 12/381,419

(22) Filed: Mar. 11, 2009

(65) Prior Publication Data

US 2010/0232965 A1 Sep. 16, 2010

(51) Int. Cl.
*A47C 7/74* (2006.01)
*F04D 29/00* (2006.01)

(52) U.S. Cl. .............. 416/169 R; 416/172; 416/187

(58) Field of Classification Search .............. 416/169 R, 416/172, 187, 42, 120
See application file for complete search history.

(56) References Cited

U.S. PATENT DOCUMENTS

| 2004/0047733 | A1* | 3/2004 | Gasendo | 416/120 |
| 2004/0151578 | A1* | 8/2004 | Wobben | 415/4.1 |

\* cited by examiner

*Primary Examiner* — Theresa T Doan
(74) *Attorney, Agent, or Firm* — William E. Pelton; Cooper & Dunham LLP

(57) ABSTRACT

A vertical axis wind turbine has a stator shaft, an electrical generator, a rotating shaft and multiple blades. The electrical generator is rotatably mounted around the stator shaft. The rotating shaft is mounted on and protrudes from the electrical generator. The multiple blades are disposed around the electrical generator and orientated to balance each other. Each blade is connected to the rotating shaft by at least one strut and has a luff edge tapering to a lee edge. The at least one strut is formed on and protrudes from the blade is connected to the rotating shaft. The blades are rotated by the wind independent of wind direction and rotate the electrical generator to convert wind power into electric power.

11 Claims, 6 Drawing Sheets

VERTICAL AXIS WIND TURBINE

BACKGROUND OF THE INVENTION

1. Field of the Invention

The present invention relates to a wind turbine, and more particularly to a vertical axis wind turbine with a rotating shaft and multiple blades being connected to and disposed around the rotating shaft for optimized balance.

2. Description of Related Art

With reference to FIG. 7, a conventional horizontal axis wind turbine (HAWT) (70) comprises a mast, an electrical generator and three blades.

The electrical generator is mounted on the mast and has a horizontal stator shaft. The three blades are connected securely to the stator shaft and are rotated by wind to convert wind into electric power, and are self-adjusting to face into the wind. Each blade has a blade length. The blade length must be shorter than a height of the mast to keep the blade rotating smoothly.

Furthermore, cost considerations of blade materials and expensive electronics lead to a preference for longer blades. Therefore, HAWT are not preferred for domestic or micro-generation.

Further, since the blades of the conventional wind turbine (70) constantly adjust to face into the wind and the efficiency of the wind turbine is reduced. Further, near the ground and especially in cities, turbulent air further reduces efficiency of HAWT.

To overcome the shortcomings, the present invention tends to provide a wind turbine to mitigate or obviate the aforementioned problems.

SUMMARY OF THE INVENTION

The main objective of the invention is to provide a vertical axis wind turbine with a rotating shaft and multiple blades being connected to and disposed around the rotating shaft for optimized balance.

The vertical axis wind turbine has a stator shaft, an electrical generator, a rotating shaft and multiple blades. The electrical generator is rotatably mounted around the stator shaft. The multiple blades connected to the electrical generator and orientated to balance each other. Each blade has at least one strut connecting the blade to the electrical generator. The blades and struts have luff edges and lee edges. The luff edges tapers toward the lee edge for improved aerodynamics. The blades are rotated by wind and rotate the electrical generator to convert wind power into electric power Other objects, advantages and novel features of the invention will become more apparent from the following detailed description when taken in conjunction with the accompanying drawings.

DETAILED DESCRIPTION OF PREFERRED EMBODIMENT

Figure 1:
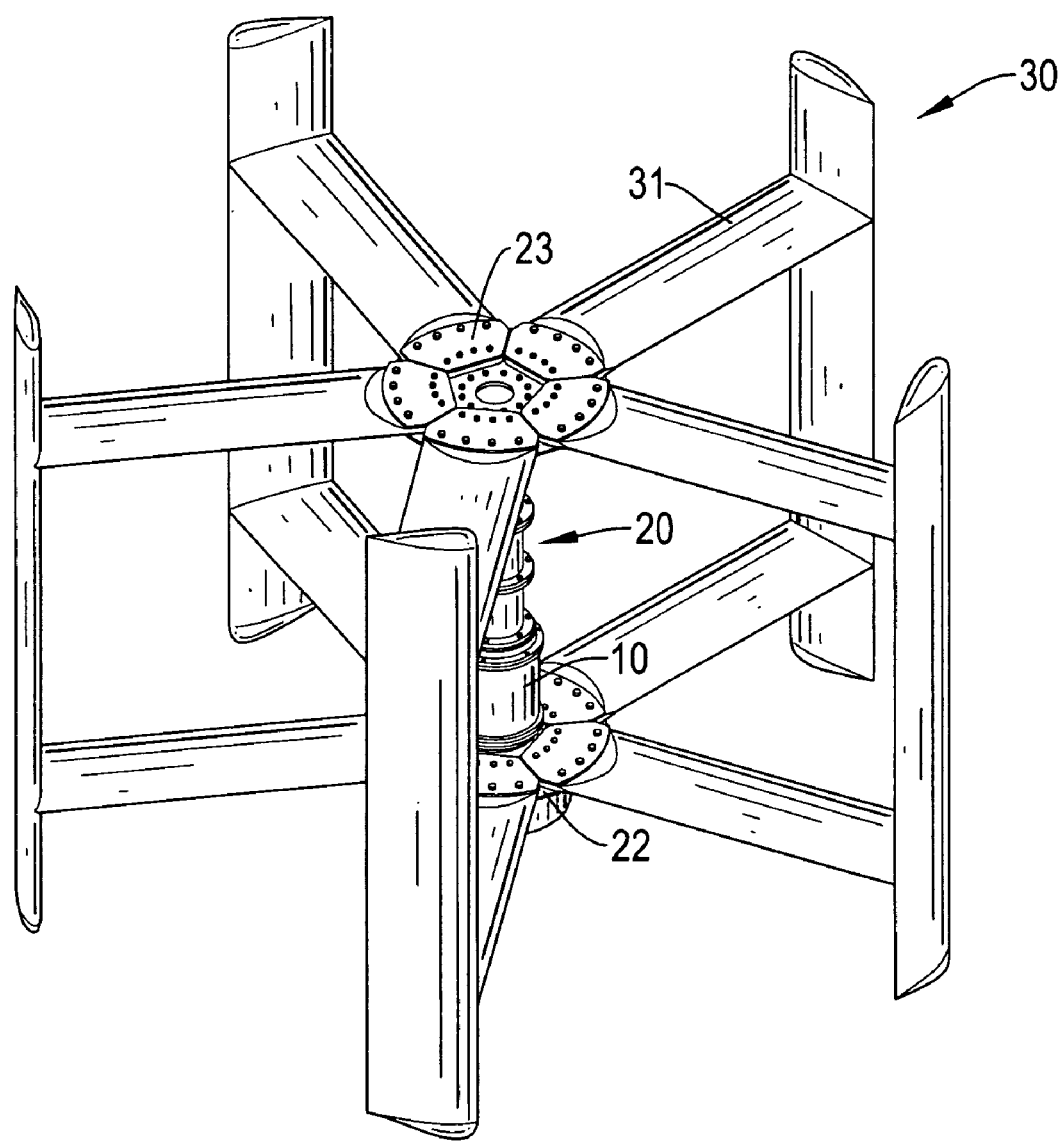
FIG. 1 is a perspective view of a wind turbine in accordance with the present invention.
Figure 2:
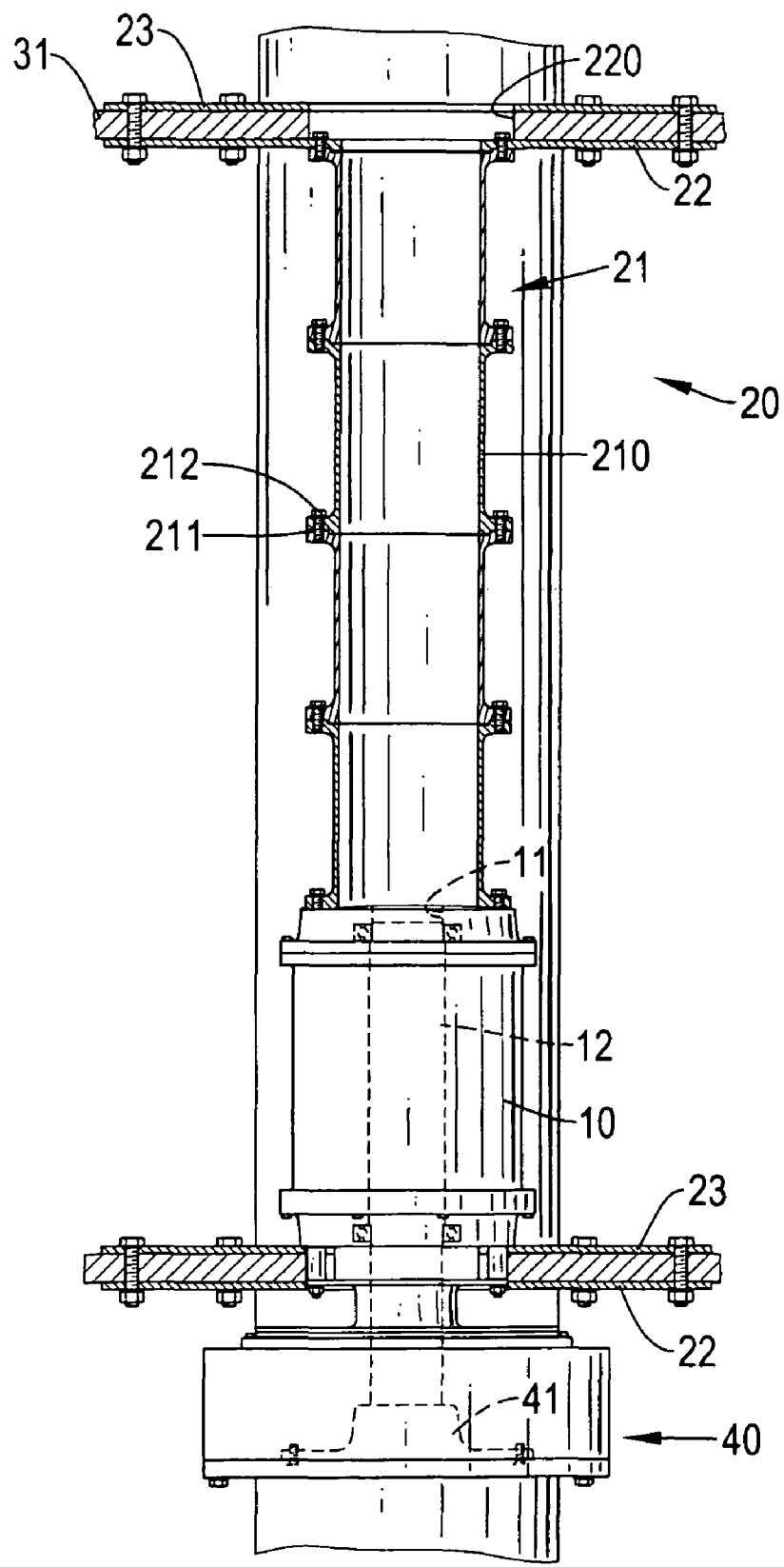
FIG. 2 is an enlarged side view in partial section of the wind turbine in FIG. 1.
Figure 5:
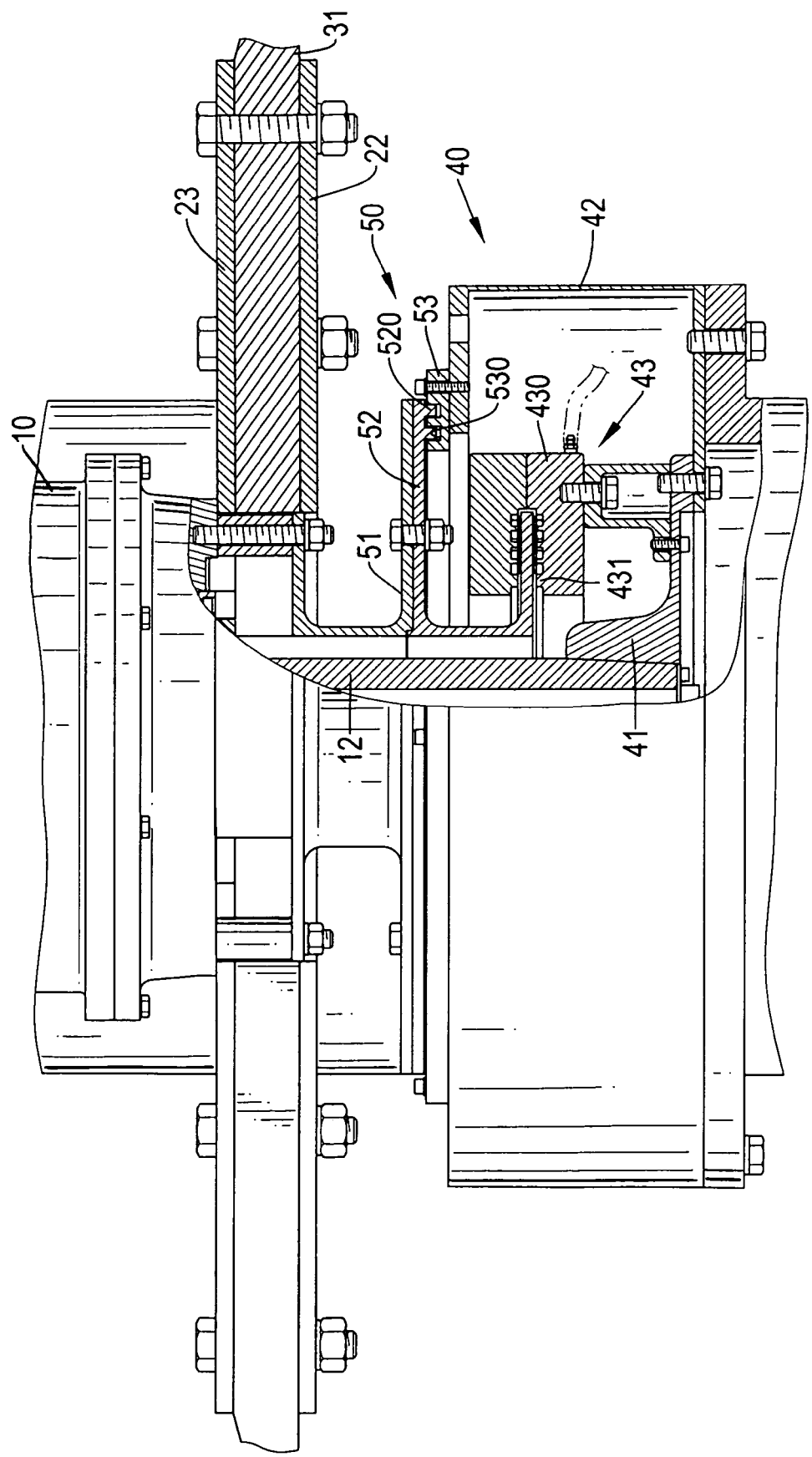
FIG. 5 is an enlarged side view in partial section of a brake of the wind turbine in FIG. 1.

With reference to FIGS. 1, 2 and 5, a vertical axis wind turbine (VAWT) in accordance with the present invention has a stator shaft (12), an electrical generator (10), a rotating assembly (20), multiple blades (30), an optional braking disc (50) and an optional brake (40).

The stator shaft (12) may be disposed perpendicular to the ground, and may be on the ground, on a building, lamppost or the like.

The electrical generator (10) is rotatably mounted on the stator shaft (12) and has a stator hole (11), a mounting surface and an annular surface. The stator hole (11) is formed centrally through the electrical generator (10) and is mounted rotatably around the stator shaft (12).

The rotating assembly (20) is connected securely to the electrical generator (10) and has a rotating shaft (21), two blade mounts (22) and multiple optional mounting plates (23).

The rotating shaft (21) is mounted on the mounting surface of the electrical generator (10), and may be hollow for reducing weight, is driven to rotate the electrical generator (10) and has a distal end, multiple optional connecting tubes (210) and optional multiple fasteners (212).

The distal end of the rotating shaft (21) protrudes from the mounting surface of the electrical generator (10). The connecting tubes (210) are connected in series to determine a length of the rotating shaft (21), and may be added or removed. Each connecting tube (210) has two ends and two shaft flanges (211). The shaft flanges (211) are annular and respectively protrude from the ends of the connecting tube (210) and have multiple fastening holes. The fastening holes are formed through each shaft flange (211) and may align to other fastening holes formed through the shaft flanges (211) of adjacent connecting tubes (210). The fasteners (212) are respectively mounted in the fastening holes of adjacent shaft flanges (211) to connect the adjacent connecting tubes (210).

The two blade mounts (22) may be annular and each blade mount (22) has at least one shaft hole (220). The at least one shaft hole (220) is formed through the blade mount (22). The blade mounts (22) are respectively mounted on the distal end of the rotating shaft (21) and the annular surface of the electrical generator (10).

The multiple mounting plates (23) are securely connected to the blade mounts (22).

Figure 3:
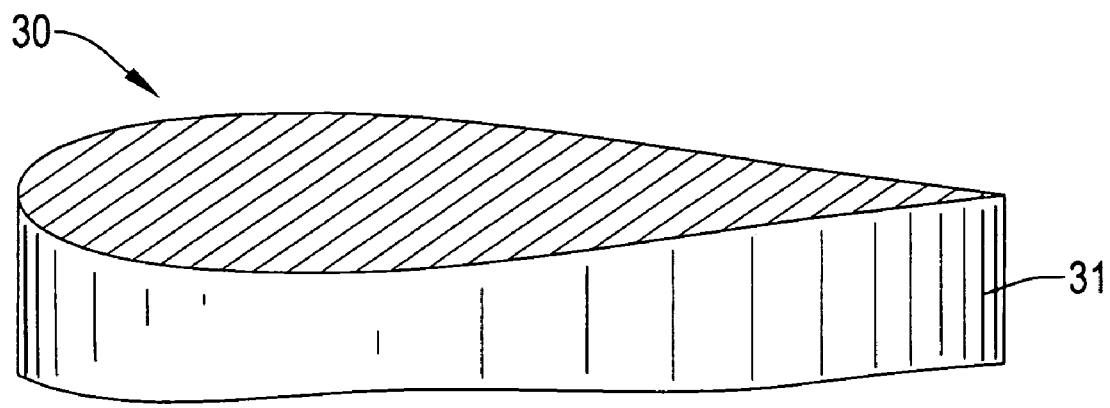
FIG. 3 is an enlarged perspective view in cross section of a blade of the wind turbine in FIG. 1.
Figure 4:
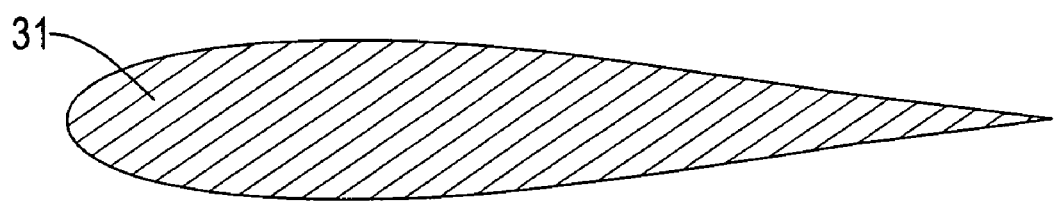
FIG. 4 is an enlarged side view in cross section of a strut of the wind vane in FIG. 1.

With further reference in FIGS. 3 and 4, the multiple blades (30) are locked between corresponding mounting plates (23) and blade mounts (22) and are disposed around the electrical generator (10) for optimized balance. Each blade (30) has a vertical vane and at least one strut (31). The vertical vane parallels the stator shaft (12), and is substantially rectangular, and has a top, a bottom, a luff edge, a lee edge and an inner surface. The top and the bottom of the vertical vane are shaped smoothly to reduce a wind resistance. The luff edge is curved and tapers toward the lee edge. The luff edge of the blade (30) may be wider than the lee edge of the blade (30). The inner surfaces of the blades (30) face the electrical generator (10). The at least one strut (31) is mounted on and protrudes from the inner surface of the blade (30) toward an axis of the stator shaft (12), and may be two struts (31) being respectively connected to the corresponding blade mounts (21). Each strut

(31) has a luff edge, a lee edge and a locking end. The luff edge of the strut (31) is curved, is adjacent to the luff edge of the blade (30) and tapers to the lee edge. The luff edge of the strut (31) may be wider than the lee edge of the strut (31). The locking ends of the strut (31) are rectangular and are locked between a corresponding mounting plate (23) and blade mount (22).

The braking disc (50) is mounted on the annular surface of the electrical generator (10), and is rotatably mounted around the stator shaft (12) and has a connecting disc (51), a clamping disc (52) and a washer (53).

The connecting disc (51) has an annular connecting edge and an annular mounting edge. The connecting edge of the connecting disc (51) is connected to the mounting surface of the electrical generator (10).

The clamping disc (52) is connected to the connecting disc (51), and has an annular linking edge, an annular braking edge and multiple annular ribs (520). The linking edge of the clamping disc (52) is connected to the mounting edge of the connecting disc (51) and has an eave. The multiple annular ribs (520) protrude from the eave of the linking edge of the clamping disc (52).

The washer (53) is adjacent to the eave of the linking edge and has multiple washer recesses (530). The washer recesses (530) are formed in the washer (53) and corresponds to the annular ribs (520) of the clamping disc (52).

The brake (40) is mounted around the stator shaft (12) and the clamping disc (52) of the braking disc (50), and may be set on a ground, a mast, a tower or the like, and has a brake box (42), a shaft frame (41) and a brake caliper (43).

The brake box (42) has a brake space, a holding surface, a mounting hole and a setting base. The brake space is defined in the brake box (42). The holding surface is adjacent to the braking disc (50). The mounting hole is formed through the holding surface and communicates with the brake space of the brake box (40), and is mounted around the stator shaft (12) and the clamping disc (52) of the braking disc (50). The setting base may be fixed on the ground or the mast. The shaft frame (41) is mounted on the setting base and has a shaft mount. The shaft mount is securely connected to the stator shaft (12).

The brake caliper (43) is mounted on the setting base, and selectively clamps the braking edge of the clamping disc (52) of the braking disc (50), and has two clamping plates (430). The clamping plates (430) are driven by air pressure and have opposite inner surfaces and multiple braking protrusions (431). The braking protrusions (431) protrude from the inner surfaces of the clamping plates (430) and selectively clamp the braking edge of the clamping disc (52) to stop the wind turbine rotating.

Figure 6:
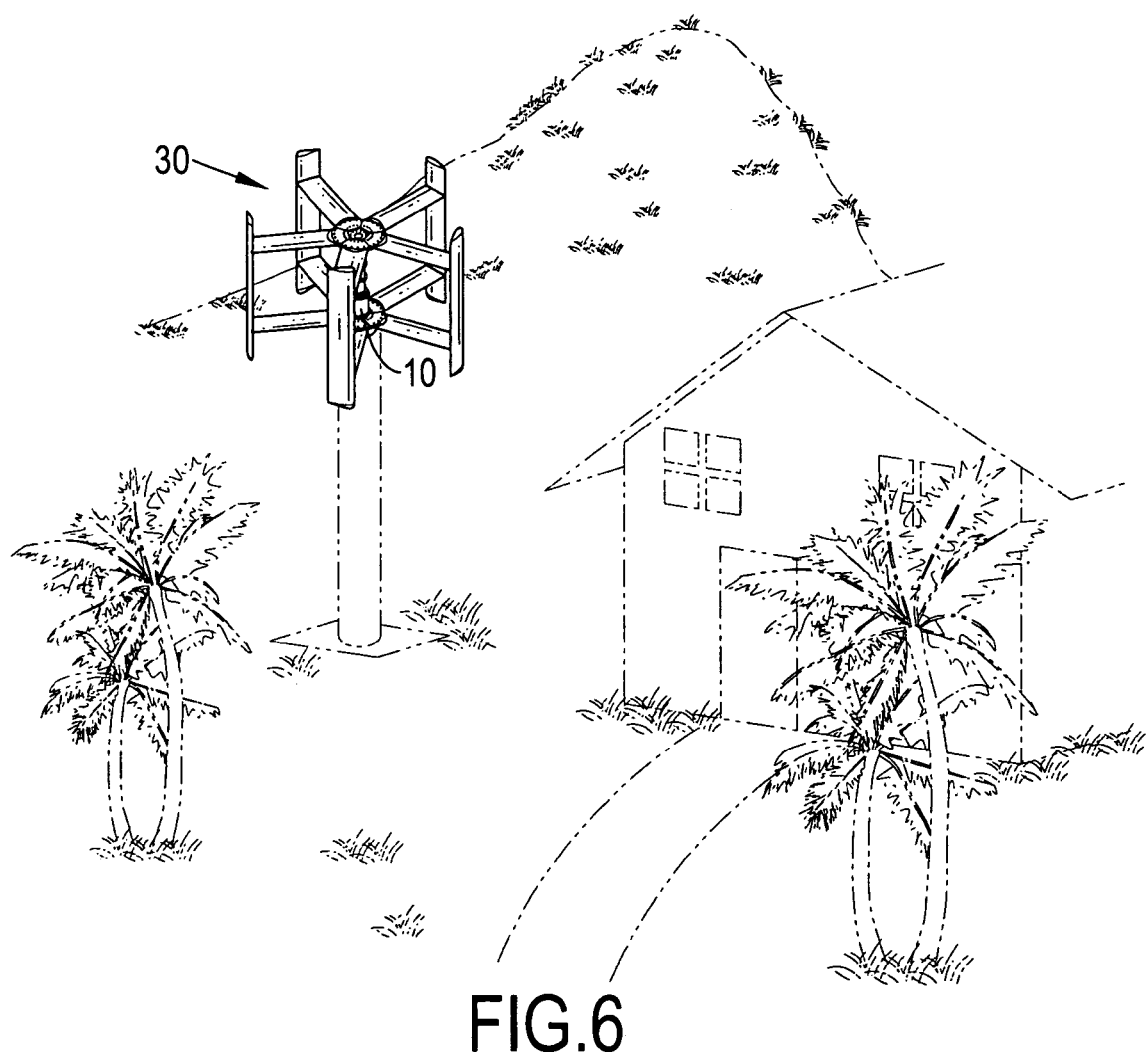
FIG. 6 is an operational perspective view of the wind turbine in FIG. 1.
Figure 7:
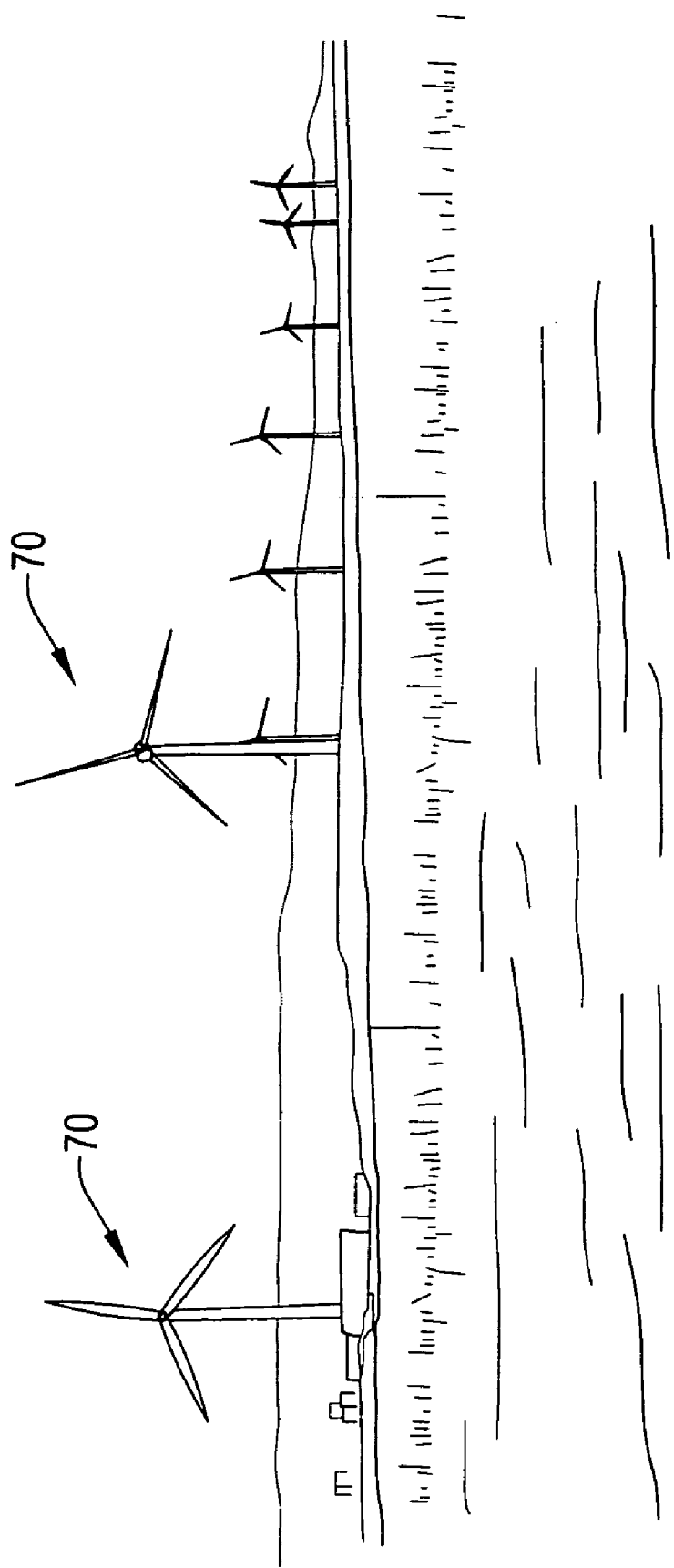
FIG. 7 is an operational perspective view of a conventional wind turbine in accordance with the prior art.

With further reference in FIG. 6, the wind turbine may be set on a ground, a mast, a tower or the like, and may be rotated by wind to convert wind power into electric power.

The blades (30) are set around the electrical generator (10) and are rotated independent of wind direction. The blades (30) is set around the electrical generator (10) and has vertical vanes parallel the stator shaft (12) so do not limit height of the mast, and can be built easily. In addition, the blades (30) and struts (31) have aerodynamically formed luff edges and lee edges for improved efficiency.

Furthermore, the brake (40) may selectively clamp the braking disc (50) to stop the wind turbine rotating to control the wind turbine.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A vertical axis wind turbine comprising:
   a stator shaft;
   an electrical generator being rotatably mounted on the stator shaft and having
      a mounting surface;
      a stator hole being formed through the electrical generator and rotatably mounted around the stator shaft; and
   a rotating assembly connecting to the electrical generator and having a rotating shaft being mounted on the mounting surface of the electrical generator; and
   multiple blades being disposed around the electrical generator for optimized balance, wherein
      each blade has
      a vertical vane being parallel with the stator shaft and having
         a luff edge;
         a lee edge being tapered from the luff edge; and
         an inner surface facing to the electrical generator; and
      at least one strut extending from the inner surface of the vertical vane toward the generator and having a locking end being connected to the rotating shaft.

2. The wind turbine as claimed in claim 1, wherein
   the electrical generator further has an annular surface;
   the stator shaft extends from the annular surface of the electrical generator and has a fixing end; and
   the wind turbine further has
   a braking disc being mounted on the annular surface of the electrical generator, and being rotatably mounted around the stator shaft; and
   a brake being mounted around the braking disc, and being connected to the fixing end of the stator shaft, and selectively stopping the braking disc.

3. The wind turbine as claimed in claim 2, wherein the brake further has
   a brake caliper selectively clamping the braking disc and having
      two clamping plates having
         opposite inner surface surfaces; and
         multiple braking protrusions respectively protruding from the inner surfaces of the clamping plates, and selectively clamping the braking disc.

4. The wind turbine as claimed in claim 1, wherein each blade has two struts respectively connecting to the rotating shaft and the electrical generator, wherein
   each strut further has
   a luff edge being adjacent to the luff edge of a corresponding vertical vane; and
   a lee edge being tapered from the luff edge of the strut.

5. The wind turbine as claimed in claim 3, wherein the each blade has two struts respectively connecting to the rotating shaft and the electrical generator, wherein
   each strut further has
   a luff edge being adjacent to the luff edge of a corresponding vertical vane; and
   a lee edge being tapered from the luff edge of the strut.

6. The wind turbine as claimed in claim 1, wherein
   the rotating shaft is hollow and further has multiple connecting tubes being connected series.

7. The wind turbine as claimed in claim 5, wherein the rotating shaft is hollow and further has multiple connecting tubes being connected series.

8. The wind turbine as claimed in claim 1, wherein the wind turbine further has two blade mounts respectively connecting the rotating shaft and the electrical generator to the two struts of each blade.

9. The wind turbine as claimed in claim 7, wherein the wind turbine further has two blade mounts respectively connecting the rotating shaft and the electrical generator to the two struts of each blade.

10. The wind turbine as claimed in claim 1, wherein the wind turbine further has multiple mounting plates respectively being mounted on the blade mounts, and corresponding to and locking the struts of the multiple blades on the corresponding blade mounts.

11. The wind turbine as claimed in claim 9, wherein the wind turbine further has multiple mounting plates respectively being mounted on the blade mounts, and corresponding to and locking the struts of the multiple blades on the corresponding blade mounts.

* * * * *